United States Patent [19]

McCoy et al.

[11] Patent Number: 5,717,216

[45] Date of Patent: Feb. 10, 1998

[54] THICKNESS GAUGING USING ULTRAVIOLET LIGHT ABSORPTION

[75] Inventors: Bill N. McCoy; Jeffrey W. Sweet, both of Chesterfield, Va.

[73] Assignee: Reynolds Metals Company, Richmond, Va.

[21] Appl. No.: 731,543

[22] Filed: Oct. 16, 1996

[51] Int. Cl.⁶ .......................... G01B 11/06; G01N 21/33
[52] U.S. Cl. .......................... 250/372; 250/461.1
[58] Field of Search .................. 250/372, 461.1, 250/459.1

[56] References Cited

U.S. PATENT DOCUMENTS

| Re. 34,783 | 11/1994 | Coates | 250/372 |
|---|---|---|---|
| 3,565,535 | 2/1971 | Monell | 356/201 |
| 3,746,869 | 7/1973 | Lindstedt et al. | 240/218 |
| 3,762,817 | 10/1973 | Harklau | 356/73 |
| 3,807,873 | 4/1974 | Nakamori | 356/188 |
| 3,851,870 | 12/1974 | Adler et al. | 356/51 |
| 4,097,731 | 6/1978 | Krause et al. | 250/205 |
| 4,208,129 | 6/1980 | Spencer | 356/425 |
| 4,278,353 | 7/1981 | Ostermayer, Jr. | 356/416 |
| 4,653,908 | 3/1987 | Yajima et al. | 356/51 |
| 5,155,555 | 10/1992 | Wetegrove et al. | 250/372 |
| 5,194,910 | 3/1993 | Kirkpatrick, Jr. et al. | 356/70 |

FOREIGN PATENT DOCUMENTS

| 0129646 | 7/1985 | Japan | 250/372 |
|---|---|---|---|
| 0043503 | 2/1987 | Japan | 250/372 |

*Primary Examiner*—David P. Porta
*Assistant Examiner*—Richard Hanig
*Attorney, Agent, or Firm*—Alan T. McDonald

[57] ABSTRACT

A method and apparatus for determining the thickness of an organic coating on a metal surface are disclosed. The surface of the metal is illuminated with ultraviolet light and the intensity of the reflected ultraviolet light is measured to determine the coating thickness.

7 Claims, 3 Drawing Sheets

THICKNESS GAUGING USING ULTRAVIOLET LIGHT ABSORPTION

FIELD OF THE INVENTION

The present invention involves determining the relative thickness of an organic coating, e.g., a polymer or lubricant, on the surface of a metal, such as aluminum, at specific ultraviolet wavelengths. The method includes illuminating a metal surface with an ultraviolet light source located normal to the sample surface and measuring the reflected ultraviolet light at an angle 30°–40° normal to the sample surface. The reflection intensity, as measured by an ultraviolet detector, is proportional to the amount of organic coating on the surface of the metal sample. The greater the thickness of the coating, the greater the absorption, resulting in detection by the ultraviolet detector.

BACKGROUND OF THE INVENTION

Metals are often coated with organic material to modify the metallic surface in one of a number of ways. A binder may be applied directly to a metal substrate to provide one or more of: good adhesion, a satisfactory bonding surface for a subsequent coating, the ability to retard corrosion due to surface discontinuities, temporary protection for each surface or chemical resistance.

Additionally, as an intermediate coating, organic material may be deposited upon a metal substrate to insure an adequate film thickness for a coating or lining system, supply a uniform bond between a primer and a topcoat or fabricate a superior barrier to moisture and aggressive chemicals.

In another aspect, an organic composition may be employed as a finish coating. Such coating 1) will provide the metal with a pleasing appearance, as well as corrosion resistance; 2) it may cause a modification of the metal's surface friction characteristics; and 3) will supply weather, chemical and abrasion resistance sufficient to insure adequate protection for said metal surface. See Kirk-Othmer, *Encyclopedia of Chemical Technology*, Third edition, Vol. 6, John Wiley and Sons, New York, pp 427–481 (1979).

On the other hand, although a minimum thickness of a coating must be assured to secure the desired properties exhibited by a coating of an appropriate organic composition, an excess of such coating material must be avoided for obvious economic reasons. Accordingly, means must be utilized by the manufacturer of coated metals to insure a high-performance coating system associated with a reasonable price structure.

The method of this invention provides a means for quantitatively measuring the amount of organic material on top of a metal surface by means that afford reproducible results, with a view to controlling and optimizing the amount of said material deposited. A combination of an ultraviolet light source and a detector system sensitive to the organic coating is employed in the method.

Organic coatings exhibit an absorption of certain ultraviolet wavelengths in the range of 250–350 nanometers. By illuminating a metal surface coated with a material, such as a lubricant or polymer, using ultraviolet light of the indicated wavelengths, one may determine the amount or thickness of the coating by relating it to the amount of absorption. Said amount of absorption is detected by an ultraviolet light sensitive sensor angled to the surface of the illuminated metal surface. The amount of reflected ultraviolet light from such a coated metal surface is in turn compared with the amount of reflected ultraviolet light from a corresponding non-coated metal surface to determine relative thickness. This comparison is performed by a computer measurement system attached to the output of the ultraviolet sensitive detector. While the actual mechanism in which the organic substances absorb ultraviolet light of these wavelengths may be either molecular or atomic, they are not influential in the present measurement technique.

There are examples of other methods for using light to measure the properties of a surface. In U.S. Pat. No. 4,653,908, the patentees, Yajima et al., describe a grazing incidence reflection spectrometer. In using their device, the patentees cause light to be incident on a surface of the sample and detect the intensity of light reflected from the sample surface thereby to measure an electronic absorption spectrum of a material absorbed to said sample surface. The device is so constructed that the incident light is visible light or ultraviolet light and that said incident light has a predetermined glancing angle to the sample surface. Yajima et al., like Applicants, employ visible and ultraviolet light, in a specific range of wavelengths, between 200–700 nanometers. Also, the radiation incident to the sample surface is reflected by said surface to a radiation detector for measurement. The intensity of the reflected radiation is the measurement goal.

Nevertheless, while the foregoing similarities are apparent, there are also several important differences between the method of the patent and that claimed herein. Yajima et al. are interested in measuring chemical species absorbed to the sample surface. On the other hand, the goal of the present application is to measure chemical species atop or applied to the sample surface, not absorbed thereon. In fact, column 3, lines 3–12, of U.S. Pat. No. 4,653,908 clearly provides information that a conventional method, to which the patent application refers, does not apply to the measurement of the electronic absorption spectrum of the visible light or ultraviolet light for the "chemical species absorbed to the sample surface". This drawback was solved by defining the glancing angle so that the reflectivity of the incident light from the sample may come sufficiently close to 1 (one) and measuring said spectrum on the basis of reflected light. In connection with the above, while the incident radiation angle and the reflected radiation angle used by Yajima et al. are both less than 10° normal to the sample surface, the method now described and claimed employs an incident radiation angle of 90° normal to the sample surface (orthogonal) and a reflected radiation angle of 30°–40° normal to the sample surface.

Additionally, the patentees use scanning spectrometers for both the radiation source and the detector to measure absorption at a number of wavelengths between 200–700 nm. However, the instant invention is specific at the range of 250–350 nm, which is not scanned by a spectrometer and which wavelength is determined by the lamp output and width of a light filter.

Moreover, the patentees' equipment includes a vacuum chamber, a variable wavelength incident light supply capable of 200–700 nm wavelengths and the reflected light detector capable of 200–700 nm wavelengths. Applicants' invention, on the other hand, employs no vacuum chamber, uses a single output non-variable wavelength light supply and requires means capable of detecting 250–350 nm wavelengths. Also, Yajima et al. claim the light source and the detector, both being at an angle not to exceed 5° normal to the surface of the sample, when the sample is opaque, such as metal. However, in the instant invention, non-polarized ultraviolet light at 90° normal to the surface of the sample is employed and the detector is 30°–40° normal to said sample surface. Regarding the measurement of a transparent material, such as glass, Yajima et al. position both the light source and detector at an angle not to exceed 1° normal to the sample surface. Finally, it is evident that the material which is detected and measured by Yajima et al. is not defined, while the instant coating material is organic. Consequently, there is adequate basis for concluding that the Yajima et al. invention is distinctly different from the instant invention.

Two patents that relate to inspecting surfaces by determining differences in color are Ostermayer, U.S. Pat. No. 4,278,353 and Nakamori, U.S. Pat. No. 3,807,873. The first involves determining the condition of a gold surface by means of optical reflection. Since the surfaces of gold samples range from bright yellow to a matte brown, the difference in the samples' reflected light in the wavelength range of 450–575 nm, detected by means of an optical detector, provides an output representative of the condition of the surface. The output is compared to a reference value determined by the reflected light from a reference surface having known characteristics.

Yakamori, on the other hand, quantitatively detects a temper color appearing on a stationary or moving metal strip, in which a beam of light having a wavelength shorter than 5400 Å and another suitable component having a wavelength longer than 5400 Å are directed at a suitable angle to said metal strip. After converting the intensity of the reflected light components into electrical signals and separating the signals from one another, the patentee calculates the ratio between the signals to determine the relative depth of the temper color.

Two patents are concerned merely with measuring the ultraviolet light itself. In Coates, Reissue Pat. No. 34,783, the object of the invention is to determine the absolute reflectance value of a test material at a desired wavelength from a measured value of reflectance. In this system, reflectance is divided by system coefficient to obtain absolute reflectance. In Adler, U.S. Pat. No. 3,851,970, an instrument is disclosed and claimed for measuring the UV light in the wavelength range of 300–350 nm. The instrument is employed for measuring the radiation dosage in a UV therapy or for measuring the allowable exposure time in a sunbath.

Kirkpatrick et al., U.S. Pat. No. 5,194,910, disclose methods and apparatus employing optical spectrometry techniques to measure the condition of used motor oil. This differs significantly from the present invention which measures the thickness of a coating comprising organic polymers, resins, lubricants, etc. Kirkpatrick et al. are interested in determining metal wear debris contamination in used motor oil, in the presence of carbon particulates. However, oil degradation not accompanied by metal wear debris contamination may also be measured.

Spencer, U.S. Pat. No. 4,208,129, is related generally to spectroscopy measurement techniques and particularly to those using a laser spectroscopy measurement system which is capable of attaining measurement sensitivities of less than $10^{-4}$ at the UV, visible and near IR wavelength. The system involves transmission through a medium and does not entail the same concepts or steps as those of the presently claimed invention.

Two other patents, of even less relevance than those described above, are Monell, U.S. Pat. No. 3,565,535 and Lindstedt et al., U.S. Pat. No. 3,746,869. The former describes an optical densitometer which employs near ultraviolet light directed through a specimen to check various functions of the human body and other body properties. The instrument is useful for tests such as those performed on glucose, LDH, alcohol, etc. The other patent, Lindstedt et al., contemplates an improved method and apparatus for photometrically plotting light scattered by a light-scattering object, such as thin-layer chromatograms. The patent is not concerned with UV transmittance from a specific coating to determine the thickness of said coating, as is the instant invention.

THE INVENTION

Applicants have developed a system and method for quantitatively measuring the amount of applied organic material on top of a metal surface and obtaining reproducible data. The novel system involves a combination of an ultraviolet light source and detector means sensitive to the applied organics. The organic coating, such as a polymer or lubricant, exhibits absorption of certain ultraviolet wavelengths in the range of 250–350 nanometers.

By illuminating a metal surface, such as aluminum, to which organic coatings have been applied, using ultraviolet light of the indicated wavelengths, one may determine the amount or thickness of the coating by relating it to the amount of absorption. The extent of UV absorption is detected by an ultraviolet light sensitive sensor angled to the surface of the illuminated metal surface. The amount of reflected ultraviolet light from a coated metal surface is in turn compared with the amount of reflected ultraviolet light from a non-coated corresponding metal surface to determine the coating's relative thickness. The comparison is performed by a computer measurement system attached to the output of the ultraviolet sensitive detector.

The actual mechanism in which the organic substances absorb ultraviolet light of the indicated wavelengths may be either molecular or atomic, but are not influential in the measurement technique.

DETAILED DESCRIPTION

The description that follows further explains the method for determining the thickness of organic substances applied to a metal surface. A specific embodiment of the invention involves determining the thickness of organic substances on the surface of rolled aluminum metal. The organic substances applied to such metal surfaces include, but are not limited to, polymers and lubricants.

The present method appears to be universally effective in measuring the thickness of organic coatings on a metal. Exemplary of the organics are polymers and lubricants. For the sake of convenience, the acronym PRL (polymers, resins and lubricants) is occasionally used herein to designate the organic coating composition.

Among the polymers and resins finding use in the instant coating materials are amino resins, such as those using urea, benzoquanamine and/or melamine, as well as oxidizing alkyd resins or alkyd with any one or more of phenoplast, nitrocellulose, chlorinated rubber, polystyrene, vinyl and epoxy polymers. Also, aminoplast (with or without epoxy), silicone and oil-modified epoxy resins are useful. Similarly, vinyl acetals and/or 2,4,6-trimethylphenyl ether with one or more phenolic, allylaminoplast, or epoxy components may be used.

Other coating materials to which the invention relates comprise saturated and unsaturated polyesters and triazine resins, thermosetting acrylics, complex amino resins, vinyl acetate/vinyl chloride copolymers, vinylidene or vinyl chloride/acrylonitrile copolymers, butadiene copolymers, acrylic copolymers and poly (vinyl acetate). The method is also applicable to coatings of cellulose esters and ethers, polyurethanes, polytetrafluoroethylenes, coal tar-epoxides and polyamides, as well as copolymers of ethylene or propylene.

Applicable coating material categories also include polyolefin waxes, mineral oils and synthetic lubricants, the specific organic coating applied to a metal substrate being responsive to the industrial customer's directions.

Insofar as the metal substrate is concerned, the present method is applicable to organic coatings on all metal surfaces. Since the UV absorption of the same metal surface is measured in both the coated and the non-coated conditions, logically any variation in a specific metal's absorption characteristics should be offset by said measurements and the subsequent calculations. In any event, among the metals of particular interest for the present invention are aluminum, steel and iron.

Figure 1:
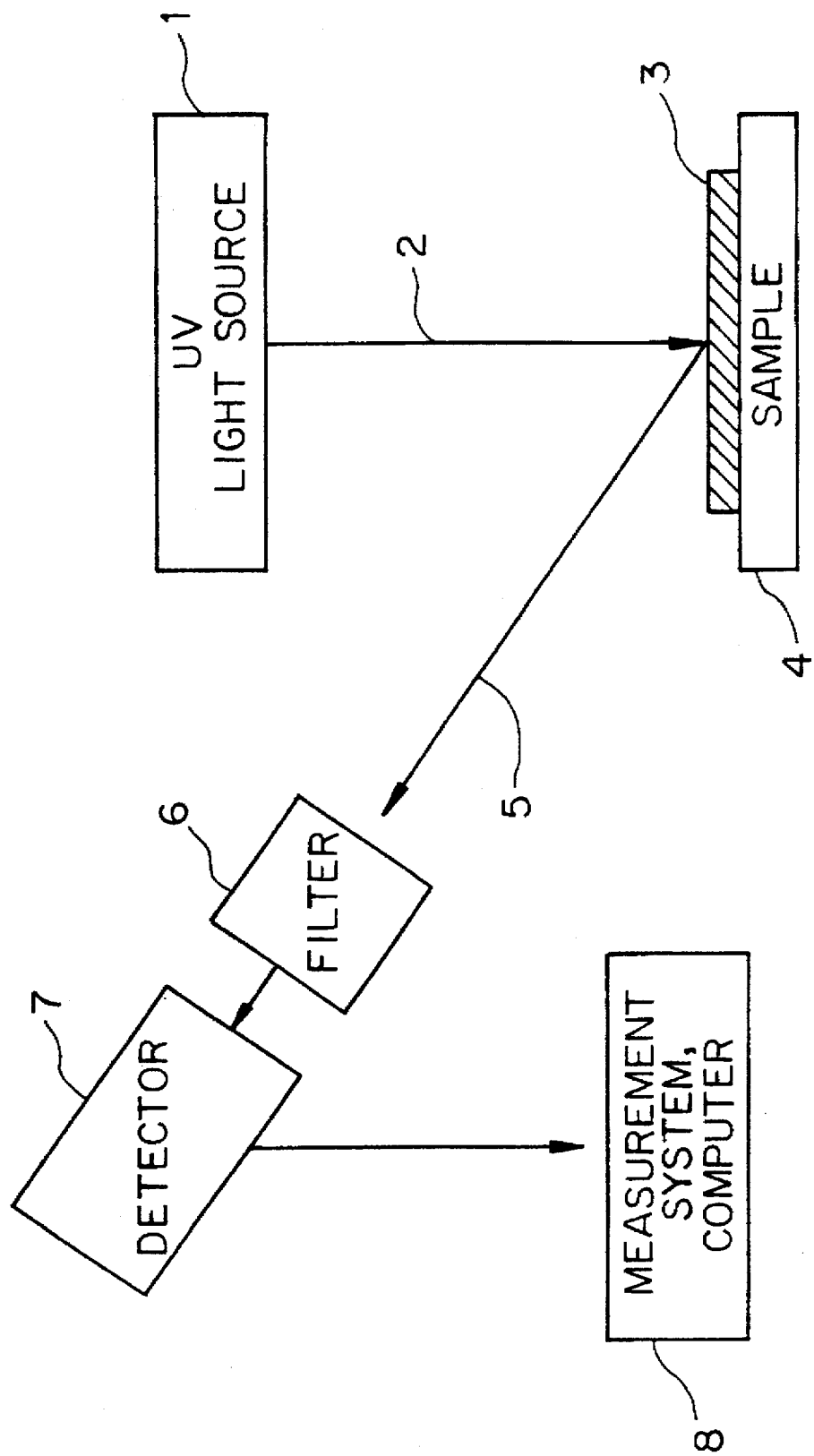
FIG. 1 is a schematic diagram illustrating the arrangement of the optical and electrical means for obtaining measurements according to the present invention.

With reference to FIG. 1, a metal surface (4) to be inspected is placed under an ultraviolet light source (1) of intensity and size sufficient to illuminate the surface evenly. The ultraviolet light source (1) is located and aligned orthogonal to the metal surface. The ultraviolet light (2) travels from the light source (1) to the metal surface and is reflected in various directions. One direction is toward an ultraviolet light detector (7) and filter (6). The amount of ultraviolet light reflected in the reflected path (5) is determined by the finish of the metal surface (4) and the amount of organic coating (3) applied to such surface. Since these organic coatings absorb ultraviolet light, the greater the organic coating (3), the less reflected ultraviolet light reaching the detector (7) and filter (6). The detector is in turn connected to an analog voltage converter device in a personal computer or some other type analog voltage measurement device.

The optical filter (6) in FIG. 1 (and FIG. 3), is an interference type optical bandpass filter. Said filter allows transmission of ultraviolet light only between about 250–350 nm to the detector, while blocking all other light down to 200 nm and from 350 nm to 1100 nm. This eliminates detector sensitivity to extraneous effects, such as ambient, non ultraviolet illumination.

Thus, the light detected by the detector (7) is only reflected light from the sample surface (5) which is 250–350 nm in wavelength.

The detector (7) in FIG. 1 (and FIG. 3) is any type of detector sensitive to ultraviolet light in the wavelengths of 250–350 nm. This may be a UV sensitive silicon detector, a UV enhanced CCD (Charge Coupled Device) detector or camera, optionally with the capability of intensifying image, a CID (Charge Injection Device) detector or camera sensitive to ultraviolet light of 250–350 nm or any other available type of ultraviolet light sensitive detector. The detector provides either a digital or an analog voltage signal to a computer (8) with an interface device so as to record the detector output. The recorded output is in turn compared with a recorded output of a corresponding metal surface free from any applied organic coating. This comparison is then used by the computer or operator to determine the thickness of the applied organic coating by interpolation of calibrated values. By such means, a reliable and repeatable measurement process is obtained.

Figure 2:
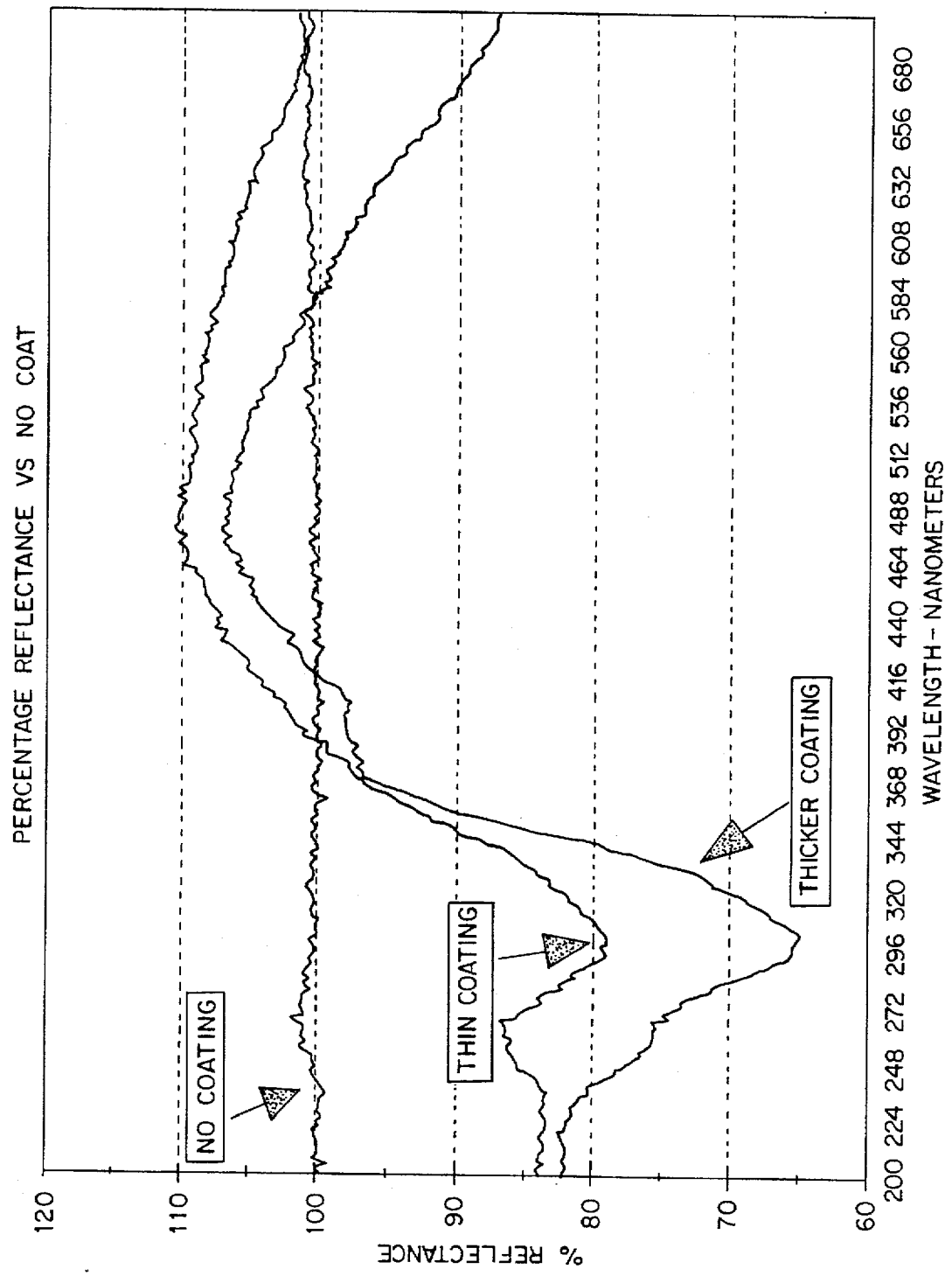
FIG. 2 is a graph illustrating the relationship between the amount of applied organic coating atop a metal surface versus wavelength. The amount detected by the ultraviolet sensitive sensor is the percent reflection from the metal surface as compared with a non-coated corresponding metal surface.

FIG. 2 illustrates an example of the physical relationship between PRL organics absorption and the wavelength of reflected light. The absorption value between about 250–350 nm wavelength is an important factor in the technique employed by the present invention for thickness measurement. As the thickness of the applied organics increases, the percent reflectance of light between 250–350 nm decreases due to absorption. The percent reflectance is relative to an organics free metal surface, plotted "no coating".

Absorbence appears to be linear. Assuming bare metal to yield a reflected value of $R_{max}$ and that a calibrated response of $R_{min}$ is obtained from a calibrated coating weight of $W_c$. Coating weight (thickness) can therefore be calculated by the formula:

$$((R-R_{min})/(R_{max}-R_{min}))*W_c$$

Particular equipment used may require an offset, minor change to the formula, or multiplication factor which can be easily determined by calibration of the equipment.

Figure 3:
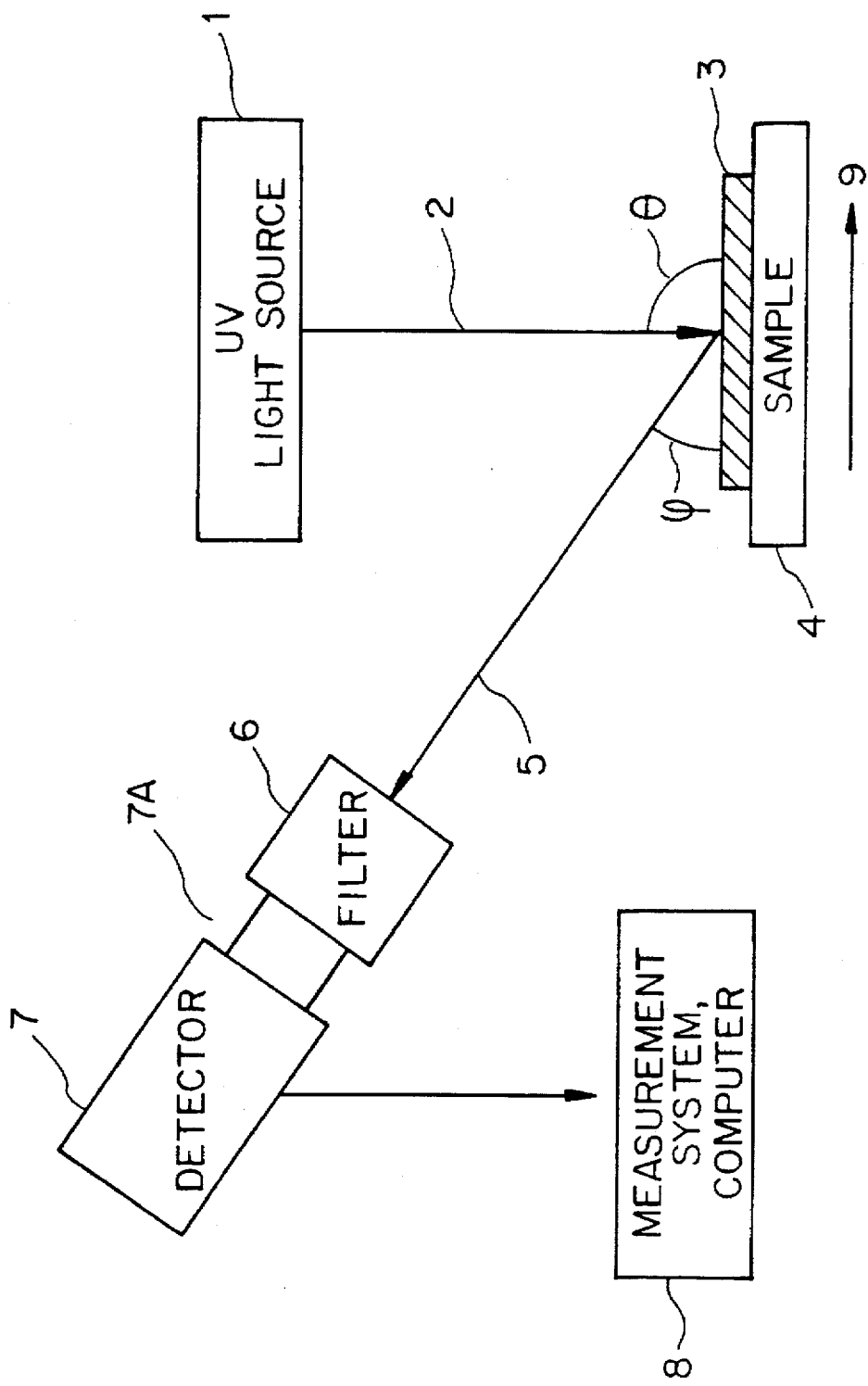
FIG. 3 is a more detailed diagram of the arrangement of the optical and the electrical means for obtaining measurements according to the present invention.

FIG. 3 details the angles employed in the instant measurement system. The incident ultraviolet light (2) from the light source (1) is directed toward the organic coated metal surface (4) at an angle $\Theta$. Said angle $\Theta$ is 90° or orthogonal to the metal surface. The reflected ultraviolet light is detected by the filter-detector assembly at angle $\psi$. The optimal measurement angle $\psi$ of the measurement system was determined to be between 30°–40° from the metal surface. Larger angles reduce the ability to measure percent reflectance due to the greater specular content of the reflected light. Smaller angles reduce the overall ability to detect reflected light due to low sensitivity.

In addition, FIG. 3 includes an ultraviolet focusing lens (7A), for imaging the reflected light (5), which has been filtered (6) onto the detector (7). This detector could be an ultraviolet light sensitive CCD camera, matrix or line scan type. The CCD camera may or may not employ an ultraviolet light sensitive image intensifier. The detected reflected light, may it be an analog voltage or camera image, is then compared with calibrated, non-coated metal surface voltage or image by a computer system. The resulting comparison, in turn, may be used to calculate the thickness of the applied organic coating. Finally, FIG. 3 illustrates the use of this applied organic thickness measurement technique to measure coatings, not only on top of a static metal surface, but also on a moving metal surface, for on-line, in-process thickness measurement. In the case of a moving metal surface, the direction of motion of the surface is indicated by arrow (9).

EXAMPLE

Equipment corresponding to FIG. 1 was employed to measure the thickness of a polyvinyl chloride coating on an aluminum specimen. The UV light source was an Oriel Corporation Model 73404 Xenon Lamp mounted on an Oriel Model 7340 Universal Monochromator Illuminator and powered by an Oriel Model 68806 Arc Lamp Power Supply. The filter was an Oriel Model 77250 Grating Monochrometer. The detector was an Oriel Model 70116 Silicon Detector Head in series with an Oriel Model 75152 Variable Frequency Chopper. The computer interface was an Oriel Model 70100 Merlin Radioneter System. The computer was a Gateway 2000 Model P5-60 with 24 MB of RAM running Oriel Runes II Radiometry software. The test resulted in the data shown as a graph in FIG. 2.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A thickness measuring system to determine the thickness of a coating of organic material atop a moving metal surface, which comprises, in combination:
   (A) an ultraviolet light source of sufficient intensity and size to illuminate the metal surface, said light source being capable of producing UV light at wavelengths of about 250–350 nanometers;
   (B) means for moving the metal surface under said ultraviolet light source;
   (C) means for maintaining said ultraviolet light source 90° normal to the metal surface;
   (D) an ultraviolet light sensitive detector assembly comprising an ultraviolet light bandpass filter which transmits light only between about 250–350 nm, a lens capable of focusing ultraviolet light and an ultraviolet light sensitive detector of sufficient sensitivity to detect reflected ultraviolet light from the moving metal surface positioned 30°–40° normal to the moving metal surface; and
   (E) a measurement system comprising a computer and necessary interface materials capable of measuring the detector signal and comparing it with calibrated values to produce a thickness measurement.

2. A method for measuring the thickness of an organic coating atop a moving metal surface comprising, in combination, the steps:
   (A) providing an ultraviolet light source of sufficient intensity and size to illuminate the metal surface, said light source being capable of producing UV light at wavelengths of about 250–350 nanometers;
   (B) moving the metal surface under the ultraviolet light source;
   (C) maintaining the ultraviolet light source 90° normal to the metal surface and focusing UV light from the light source onto the coating atop the metal surface;
   (D) providing an ultraviolet light sensitive detector assembly comprising an ultraviolet light bandpass filter which transmits light between only about 250–350 nm and a lens capable of focusing UV light and a UV light sensitive detector of sufficient sensitivity to detect reflected UV light from the moving metal surface and positioned 30°–40° normal to the moving metal surface; and
   (E) providing a measurement system comprising a computer and necessary interface materials capable of measuring the detector signal and comparing it with calibrated values to produce a thickness measurement.

3. The method of claim 2, wherein the metal surface is an aluminum surface.

4. The method of claim 2, wherein the organic coating comprises a lubricant.

5. The method of claim 2, wherein the organic coating comprises a polyolefin wax.

6. The method of claim 3, wherein the organic coating comprises a lubricant.

7. The method of claim 3, wherein the organic coating comprises a polyolefin wax.

* * * * *